United States Patent Office 3,014,038
Patented Dec. 19, 1961

3,014,038
ARYL-SULFONYLAMINO-PYRAZOLES
Jean Druey, Riehen, Paul Schmidt, Therwil, and Max Wilhelm and Kurt Eichenberger, Basel, Switzerland, assignors to Ciba Pharmaceutical Products Inc., Summit, N.J.
No Drawing. Filed June 22, 1959, Ser. No. 821,645
Claims priority, application Switzerland June 25, 1958
15 Claims. (Cl. 260—294.8)

The present invention relates to 3-arylsulfonylamino-pyrazoles in which the aryl radical is a phenyl radical whose p-position is unsubstituted or substituted by an aliphatic or alicyclic hydrocarbon radical or by a free or substituted hydroxyl or mercapto group, and in which one of the cyclic nitrogen atoms is substituted, and their N-acyl derivatives and salts thereof, and a process for preparing same.

The group substituting the cyclic nitrogen atom of the pyrazole ring is more especially in aliphatic or cycloaliphatic hydrocarbon radical or an aryl radical, for example a phenyl radical or a heterocyclic radical, for example a mononuclear nitrogenous heterocyclic radical, such as a pyridyl radical. The new compounds may be further substituted in any desired manner, inter alia in the pyrazole nucleus, for example by an aliphatic or cycloaliphatic hydrocarbon radical, aryl or aralkyl radicals, or in the other rings, for example, by aliphatic or cycloaliphatic hydrocarbon radicals, free or substituted hydroxyl, amino or mercapto groups, halogen atoms or nitro groups.

The term aliphatic hydrocarbon radicals refers more especially to lower alkyl radicals such as the methyl, ethyl, propyl, isopropyl, butyl, secondary butyl, pentyl, or isopentyl radical. Among the cycloaliphatic hydrocarbon radicals cyclopentyl and cyclohexyl may be specially mentioned. Preferred aryl radicals are phenyl radicals, and aralkyl radicals are preferably benzyl radicals. The heterocyclic radical is especially the pyridyl-(2)-radical. Preferred substituted hydroxyl or mercapto groups are lower alkoxy groups such as methoxy or methylenedioxy, phenoxy groups or lower alkylmercapto groups such as methylmercapto groups. Substituted amino groups are above all mono- or dialkylamino groups such as the dimethylamino group. An acyl radical at the nitrogen atom is more especially a lower fatty acid radical, such as the acetyl radical.

The invention relates more especially to compounds of the formula

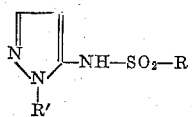

in which R stands for an unsubstituted or methyl-substituted phenyl radical and R′ for a phenyl or pyridyl-(2) radical, and salts thereof.

The new compounds have valuable pharmacological properties. They activate the functioning of the liver in the case of hepatic complaints and can, therefore, be used as medicaments.

Of particular value is 3-benzene-sulfonamido-2-phenyl-pyrazole of the formula

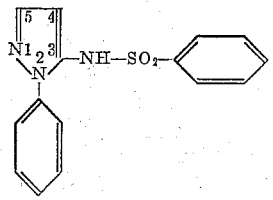

and 3-benzene-sulfonamido-2-pyridyl-(2')-pyrazole, and their salts, especially alkali metal salts.

The new compounds can be made by methods known for the manufacture of substituted sulfonamides. The process consists, for example, in reacting a compound of the formula aryl-SO₂-X (in which the aryl radical has the meaning defined hereinbefore) with an N-substituted 3-Y-pyrazole or a dihydro derivative thereof, in which formula X and Y stand for radicals that are eliminated during the reaction, except for an imino group, —NH—, contained in X or Y. If desired, a resulting acylatable compound is N-acylated and/or a resulting acid compound is converted into a salt; or from a resulting salt and/or N-acyl derivative the free or unsubstituted compound are made; and, if desired, a dihydropyrazole compound obtained at any stage of the process is oxidized to the pyrazole compound.

Thus, for example, a benzenesulfonic acid halide, whose p-position is unsubstituted or substituted as described above, and which may contain further substituents, more especially a chloride (for example benzene- or toluene-sulfonyl chloride), may be reacted with a 3-aminopyrazole in which a cyclic nitrogen atom is substituted, a diacyl product usually being obtained as by-product. The reaction according to the present invention is advantageously performed in the presence of a diluent and/or condensing agent, for example in anhydrous pyridine. The reaction takes place even under mild conditions, for example at room temperature. It is of advantage to start the reaction at room temperature and to heat the reaction mixture on a steam bath after subsidence of the exothermic reaction.

If oxidation is necessary, it may be performed in the usual manner, for example with the use of an oxidant such as a ferric salt, hydrogen peroxide or the like. N-acylation or hydrolysis is also carried out in a conventional manner.

Of the new compounds salts can be prepared in the usual manner, for example by reaction with bases, such as a hydroxide of ammonia or of an alkali metal or alkaline earth metal, or with an organic base.

The invention further covers any variant of the present process in which a compound obtained at any stage of the process is used as starting material and the remaining step or steps are performed or the process is terminated at any desired stage, or the starting materials are prepared under the reaction conditions.

The starting materials are known or can be made by as such known methods.

2-pyridyl-(2')-3-amino-pyrazoles having a free or functionally converted carboxyl group in 4-position, and their salts, are new. They are important intermediate products for the preparation of medicaments.

The new compounds and their salts can be used as medicaments, for example in the form of pharmaceutical preparations which contain them in admixture with a solid or liquid organic or inorganic pharmaceutical excipient suitable for enteral or parenteral administration. The excipient is made from a substance that does not react with the new compounds, such as water, gelatine, lactose, starch, colloidal silicic acid, magnesium stearate, talc, vegetable oils, benzyl alcohols, gums, polyalkyleneglycols, white petroleum jelly, cholesterol or other known medicinal excipients. The pharmaceutical preparations may be, for example, tablets, dragees, or in liquid form solutions, suspensions or emulsions. If desired, they are sterilized and/or contain auxiliaries such as preservatives, stabilisers, wetting agents or emulsifiers, salts for varying the osmotic pressure, or buffers. They may also contain further therapeutically valuable substances. The preparations are formulated by the conventional methods.

The following examples illustrate the invention:

*Example 1*

19.1 grams of para-toluenesulfonylchloride are entered within about 30 minutes into a solution of 15.9 grams of 3-amino-2-phenylpyrazole in 70 cc. of anhydrous pyridine, with the temperature rising to 55° C. When the reaction has subsided, the reaction mixture is heated for a further hour at an internal temperature of 90 to 95° C., then poured into 400 cc. of N-hydrochloric acid, allowed to stand overnight, and the precipitate is then suctioned off. The filter cake is thoroughly pasted in 250 cc. of 5 N-sodium hydroxide solution. A small amount of undissolved N - para - toluenesulfonyl - 3-(para-toluenesulfonamido) - 2-phenylpyrazole (M.P. 207–208° C.) is suctioned off, the filtrate is adjusted with 2 N-hydrochloric acid to pH 2 to 3, and the precipitate is again filtered off and recrystallized from benzene. 3-(para-toluenesulfonamido)-2-phenylpyrazole of the formula

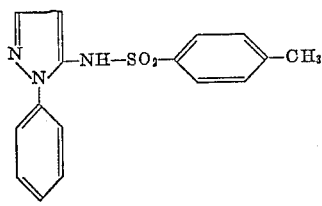

is thus obtained in colorless crystals melting at 142–144° C.

*Example 2*

17.7 grams of benzenesulfonyl chloride are entered within about 10 minutes into a solution of 15.9 grams of 2-phenyl-3-amino-pyrazole in 80 cc. of anhydrous pyridine. When the reaction has subsided, the reaction mixture is heated for one hour at 90–95° C. internal temperature, then poured into 400 cc. of N-hydrochloric acid, allowed to stand overnight, and the precipitate is then suctioned off. The latter is dissolved in 300 cc. of N-sodium hydroxide solution, and a little undissolved material is suctioned off. The filtrate is adjusted to pH 3 to 4 with 2 N-hydrochloric acid, and the precipitate is again filtered off. The product is recrystallized from a little alcohol. 3-benzenesulfonamido-2-phenyl-pyrazole of the formula

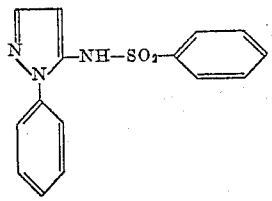

is obtained in the form of colorless crystals melting at 132–133° C.

*Example 3*

19.1 grams of ortho-toluenesulfonyl chloride are entered within 10 minutes into a solution of 15.9 grams of 3-amino-2-phenyl-pyrazole in 80 cc. of anhydrous pyridine, with the temperature rising to 50° C. When the reaction has subsided, the reaction mixture is heated for a further hour at an internal temperature of 90–95° C. The reaction solution is then poured into 400 cc. of N-hydrochloric acid, allowed to stand overnight, and the precipitate is filtered off with suction. The latter is dissolved in 300 cc. of N-sodium hydroxide solution, a small amount of undissolved material is suctioned off, the filtrate is adjusted to pH 3 to 4 with 2 N-hydrochloric acid, and the precipitate is again filtered off and recrystallized from isopropyl ether. 3-(ortho-toluenesulfonamido)-2-phenyl-pyrazole of the formula

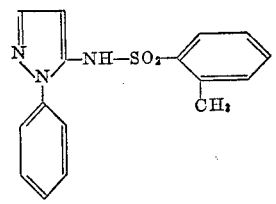

is obtained in the form of colorless crystals melting at 111–113° C.

*Example 4*

15 grams of benzenesulfonyl chloride are added to a solution of 10 grams of 2-pyridyl-(2')-3-amino-pyrazole in 75 cc. of pyridine, and the whole is heated for one hour at 50° C. 400 cc. of water are then added to the reaction mixture, the precipitate is filtered off and recrystallized from ethanol. 3-benzenesulfonamido-2-pyridyl-(2')-pyrazole of the formula

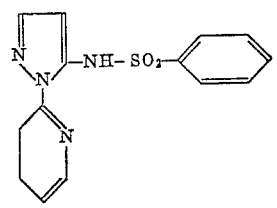

is obtained in the form of crystals melting at 102° C.

2-pyridyl-(2')-3-amino-pyrazole used as starting material is prepared as follows:

35 grams of 2-hydrazinopyridine and 55 grams of ethoxymethylene-cyanacetic acid ethyl ester are boiled under reflux in 200 cc. of ethanol for 6 hours. On cooling, crystals separate which are purified by crystallization from ethanol. In this manner there is obtained 2-pyridyl-(2')-3-amino-4-carbethoxy-pyrazole of the formula

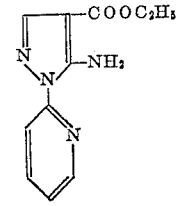

melting at 98° C.

10 grams of 2-pyridyl-(2')-3-amino-4-carbethoxy-pyrazole are boiled with 50 cc. of 2 N-sodium hydroxide solution for 3 hours. The aqueous solution is then neutralizing by adding 2 N-hydrochloric acid and the precipitate is filtered off. The latter is entered into 50 cc. of glacial acetic acid and heated at 100° C. until the evolution of carbon dioxide is finished. After adding 150 cc. of water, the reaction mass is rendered alkaline with 2 N-sodium hydroxide solution. A solid precipitate is formed which is recrystallized from a mixture of alcohol and water. 2-pyridyl-(2')-3-amino-pyrazole of the formula

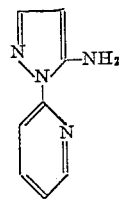

is obtained in the form of prisms melting at 112° C.

*Example 5*

10 grams of para-toluenesulfonyl chloride are added to a solution of 8 grams of 2-pyridyl-(2')-3-amino-pyrazole in 50 cc. of pyridine, and the whole is allowed to stand for 12 hours at room temperature. The mixture is then diluted with 200 cc. of water and, by adding concentrated hydrochloric acid its pH is adjusted to 3 to 4. The precipitate is dissolved in 2 N-sodium hydroxide solution, filtered through active charcoal and, by adding 2 N-hydrochloric acid to the filtrate, 3-para-toluenesulfonamido-2-pyridyl-(2')-pyrazole of the formula

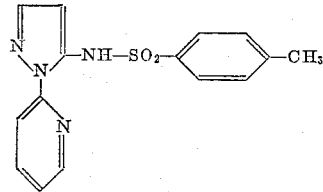

precipitates. After recrystallization from alcohol the compound melts at 122–123° C.

What is claimed is:

1. A member selected from the group consisting of compounds of the formula

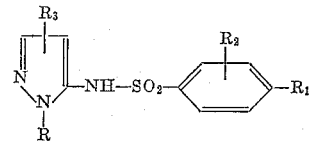

wherein R represents a member selected from the group consisting of phenyl, lower alkylphenyl, lower alkoxyphenyl, phenoxyphenyl, lower alkylmercaptophenyl, mono- and di-lower alkylaminophenyl, halogenophenyl, hydroxyphenyl, mercaptophenyl, aminophenyl, nitrophenyl and C-pyridyl, $R_1$ stands for a member selected from the group consisting of hydrogen, lower alkyl, cyclopentyl, cyclohexyl, hydroxy, mercapto, lower alkoxy, phenoxy, lower alkylmercapto and $R_2$ stands for a member selected from the group consisting of hydrogen, lower alkyl, cyclopentyl, cyclohexyl, hydroxy, mercapto, amino, lower alkoxy, phenoxy, lower alkylmercapto, mono- or di-lower alkylamino, halogen and nitro, $R_3$ stands for a member selected from the group consisting of lower alkyl, cyclopentyl and cyclohexyl, their N-lower fatty acid and N-toluene sulfonic acid acyl derivatives, and alkali and alkaline earth metal salts thereof.

2. A member selected from the group consisting of compounds of the formula

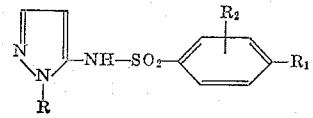

wherein R represents a member selected from the group consisting of phenyl, lower alkylphenyl, lower alkoxyphenyl, phenoxyphenyl, lower alkylmercaptophenyl, mono- and di-lower alkylaminophenyl, halogenophenyl, hydroxyphenyl, mercaptophenyl, aminophenyl, nitrophenyl and C-pyridyl, $R_1$ stands for a member selected from the group consisting of hydrogen, lower alkyl, cyclopentyl, cyclohexyl, hydroxy, mercapto, lower alkoxy, phenoxy, lower alkylmercapto and $R_2$ stands for a member selected from the group consisting of hydrogen, lower alkyl, cyclopentyl, cyclohexyl, hydroxy, mercapto, amino, lower alkoxy, phenoxy, lower alkylmercapto, mono- and di-lower alkylamino, halogen and nitro, their N-lower fatty acid and N-toluene sulfonic acid acyl derivatives, and alkali and alkaline earth metal salts thereof.

3. 3-(para-toluenesulfonamido)-2-phenyl-pyrazole.
4. N - para - toluenesulfonyl - 3 - (para - toluene - sulfonamido)-2-phenyl-pyrazole.
5. 3-(ortho-toluenesulfonamido)-2-phenyl-pyrazole.
6. 3-benzenesulfonamido-2-phenyl-pyrazole.
7. 3-benzenesulfonamido-2-pyridyl-(2')-pyrazole
8. 3-para-toluenesulfonamido-2-pyridyl-(2')-pyrazole.
9. 2-pyridyl-(2')-3-amino-pyrazole.
10. 2-pyridyl-(2')-3-amino-4-carbethoxy-pyrazole.
11. 3-benzene sulfonamido-2-Ph-pyrazole, in which Ph stands for phenyl.
12. 3-toluene sulfonamido-2-Ph-pyrazole, in which Ph stands for phenyl.
13. A member selected from the group consisting of 2-pyridyl-(2')-3-amino-pyrazole having in the 4-position a member selected from the group consisting of carboxyl and carboxyl esterified with a lower alkanol and their alkaline and alkaline earth group salts.
14. 3-benzene sulfonamido-2-Ph-pyrazole in which Ph stands for pyridyl-(2).
15. 3-toluene sulfonamido-2-Ph-pyrazole in which Ph stands for pyridyl-(2).

No references cited.